US008246796B2

(12) United States Patent
Eickhoff

(10) Patent No.: US 8,246,796 B2
(45) Date of Patent: Aug. 21, 2012

(54) FUEL CELL RECHARGER

(75) Inventor: Steven J. Eickhoff, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 251 days.

(21) Appl. No.: 12/705,407

(22) Filed: Feb. 12, 2010

(65) Prior Publication Data
US 2011/0198231 A1 Aug. 18, 2011

(51) Int. Cl.
C25B 9/10 (2006.01)
(52) U.S. Cl. ........ 204/263; 204/252; 204/264; 204/266; 429/418; 429/420; 429/421; 429/428; 429/433; 429/434; 429/444; 429/446; 429/462; 205/637; 205/628
(58) Field of Classification Search ............... 204/252, 204/263, 264, 266; 205/637, 628; 429/418, 429/420, 421, 428, 433, 434, 444, 446, 462
See application file for complete search history.

(56) References Cited

U.S. PATENT DOCUMENTS

| | | | |
|---|---|---|---|
| 2,935,382 A | 5/1960 | Osborn et al. | |
| 3,133,837 A | 5/1964 | Eidensohn | |
| 3,931,395 A | 1/1976 | Beckert et al. | |
| 4,048,385 A | 9/1977 | Regnaut | |
| 4,476,196 A | 10/1984 | Poeppel et al. | |
| 4,476,197 A | 10/1984 | Herceg | |
| 4,596,748 A | 6/1986 | Katz et al. | |
| 4,659,559 A | 4/1987 | Struthers | |
| 4,826,741 A | 5/1989 | Aldhart et al. | |
| 4,857,420 A | 8/1989 | Maricle et al. | |
| 4,876,163 A | 10/1989 | Reichner | |
| 4,906,536 A | 3/1990 | Simonton | |
| 4,910,100 A | 3/1990 | Nakanishi et al. | |
| 5,248,125 A | 9/1993 | Fritch et al. | |
| 5,298,341 A | 3/1994 | Khandkar et al. | |

(Continued)

FOREIGN PATENT DOCUMENTS

DE 19734259 2/1999

(Continued)

OTHER PUBLICATIONS

Aiello et al., "Production of Hydrogen from Cheical Hydrides Via Hydrolysis with Steam," International Journal of Hydrogen Energy, vol. 24, pp. 1123-1130, 1999.

(Continued)

*Primary Examiner* — Bruce Bell
(74) *Attorney, Agent, or Firm* — Schwegman, Lundberg & Woessner P.A.

(57) ABSTRACT

An apparatus for recharging a fuel cell cartridge and methods for recharging a fuel cell cartridge are disclosed. An example recharging apparatus may include a housing having a fuel cell cartridge holder. A water reservoir may be disposed in the housing and may have water disposed therein. The recharging apparatus may also include an electrolysis chamber for converting water into hydrogen and oxygen. The electrolysis chamber may be in fluid communication with the water reservoir. The electrolysis chamber may include a hydrogen passage for passing hydrogen from the electrolysis chamber to the fuel cell cartridge holder. The recharging apparatus may further include a vacuum pump at least selectively in fluid communication with the fuel cell cartridge holder. In some instances, the vacuum pump may be used to evacuate residual hydrogen and/or other gases or materials from the fuel cell cartridge and/or determine if the fuel cell cartridge is leaky and requires replacement.

19 Claims, 5 Drawing Sheets

U.S. PATENT DOCUMENTS

| | | | |
|---|---|---|---|
| 5,372,617 | A | 12/1994 | Kerrebrock et al. |
| 5,449,697 | A | 9/1995 | Noaki et al. |
| 5,534,363 | A | 7/1996 | Sprouse et al. |
| 5,789,100 | A | 8/1998 | Burroughs et al. |
| 5,804,329 | A | 9/1998 | Amendola |
| 5,836,750 | A | 11/1998 | Cabuz |
| 5,849,046 | A | 12/1998 | Bailey |
| 5,851,689 | A | 12/1998 | Chen |
| 5,861,221 | A | 1/1999 | Ledjeff et al. |
| 5,948,558 | A | 9/1999 | Amendola |
| 5,974,235 | A | 10/1999 | Nunally et al. |
| 6,052,124 | A | 4/2000 | Stein et al. |
| 6,054,234 | A | 4/2000 | Weiss et al. |
| 6,093,501 | A | 7/2000 | Werth |
| 6,127,058 | A | 10/2000 | Pratt et al. |
| 6,179,986 | B1 | 1/2001 | Swette et al. |
| 6,250,078 | B1 | 6/2001 | Amendola et al. |
| 6,268,076 | B1 | 7/2001 | Dickmann et al. |
| 6,280,869 | B1 | 8/2001 | Chen |
| 6,307,605 | B1 | 10/2001 | Bailey |
| 6,326,097 | B1 | 12/2001 | Hockaday |
| 6,428,680 | B1 | 8/2002 | Kreichauf |
| 6,433,129 | B1 | 8/2002 | Amendola et al. |
| 6,434,278 | B1 | 8/2002 | Hashimoto |
| 6,468,694 | B1 | 10/2002 | Amendola |
| 6,471,850 | B2 | 10/2002 | Shiepe et al. |
| 6,483,275 | B1 | 11/2002 | Nebrigic et al. |
| 6,497,973 | B1 | 12/2002 | Amendola |
| 6,506,510 | B1 | 1/2003 | Sioui et al. |
| 6,524,450 | B1 | 2/2003 | Hara |
| 6,524,542 | B2 | 2/2003 | Amendola et al. |
| 6,534,033 | B1 | 3/2003 | Amendola et al. |
| 6,535,658 | B1 | 3/2003 | Mendoza et al. |
| 6,541,149 | B1 | 4/2003 | Maynard et al. |
| 6,544,679 | B1 | 4/2003 | Petillo et al. |
| 6,586,563 | B1 | 7/2003 | Ortega et al. |
| 6,596,236 | B2 | 7/2003 | DiMeo, Jr. et al. |
| 6,610,193 | B2 | 8/2003 | Schmitman |
| 6,620,542 | B2 | 9/2003 | Pan |
| 6,632,554 | B2 | 10/2003 | Doshi et al. |
| 6,638,654 | B2 | 10/2003 | Jankowksi et al. |
| 6,645,651 | B2 | 11/2003 | Hockaday et al. |
| 6,670,444 | B2 | 12/2003 | Amendola et al. |
| 6,672,078 | B2 | 1/2004 | Ovshinsky et al. |
| 6,683,025 | B2 | 1/2004 | Amendola et al. |
| 6,706,909 | B1 | 3/2004 | Snover et al. |
| 6,727,012 | B2 | 4/2004 | Chen et al. |
| 6,728,422 | B1 | 4/2004 | Weiss |
| 6,760,488 | B1 | 7/2004 | Moura et al. |
| 6,764,785 | B2 * | 7/2004 | Colborn et al. ............... 429/430 |
| 6,801,136 | B1 | 10/2004 | Goodman et al. |
| 6,804,949 | B2 | 10/2004 | Andrews et al. |
| 6,833,207 | B2 | 12/2004 | Joos et al. |
| 6,852,436 | B2 | 2/2005 | Badding et al. |
| 6,866,806 | B2 | 3/2005 | Andrews et al. |
| 6,932,847 | B2 | 8/2005 | Amendola et al. |
| 6,939,529 | B2 | 9/2005 | Strizki et al. |
| 6,942,941 | B2 | 9/2005 | Blunk et al. |
| 6,950,030 | B2 | 9/2005 | Kovarik et al. |
| 6,953,009 | B2 | 10/2005 | Reinke et al. |
| 6,977,123 | B1 | 12/2005 | Burroughs et al. |
| 7,001,681 | B2 | 2/2006 | Wood |
| 7,019,105 | B2 | 3/2006 | Amendola et al. |
| 7,049,024 | B2 | 5/2006 | Leban |
| 7,073,368 | B2 | 7/2006 | Wood et al. |
| 7,083,657 | B2 | 8/2006 | Mohring et al. |
| 7,105,033 | B2 | 9/2006 | Strizki et al. |
| 7,108,777 | B2 | 9/2006 | Xu et al. |
| 7,128,997 | B2 | 10/2006 | Harding et al. |
| 7,322,205 | B2 | 1/2008 | Bourne et al. |
| 7,367,334 | B2 | 5/2008 | Faison, Jr. et al. |
| 7,524,342 | B2 | 4/2009 | Brinkley, III |
| 7,691,527 | B2 | 4/2010 | Petillo et al. |
| 7,727,647 | B2 * | 6/2010 | Eickhoff et al. ............. 205/637 |
| 2001/0012494 | A1 | 8/2001 | Kreichauf |
| 2001/0028973 | A1 | 10/2001 | Ong et al. |
| 2002/0068213 | A1 | 6/2002 | Kaiser et al. |
| 2002/0154310 | A1 | 10/2002 | DiMeo, Jr. et al. |
| 2002/0177031 | A1 | 11/2002 | Doshi et al. |
| 2003/0009942 | A1 | 1/2003 | Amendola et al. |
| 2003/0044656 | A1 | 3/2003 | Wood |
| 2003/0054215 | A1 | 3/2003 | Doshi et al. |
| 2003/0157018 | A1 | 8/2003 | Zaluski et al. |
| 2004/0009379 | A1 | 1/2004 | Amendola et al. |
| 2004/0011662 | A1 | 1/2004 | Xu et al. |
| 2004/0033194 | A1 | 2/2004 | Amendola et al. |
| 2004/0035054 | A1 | 2/2004 | Mohring et al. |
| 2004/0047801 | A1 | 3/2004 | Petillo et al. |
| 2004/0053100 | A1 | 3/2004 | Stanley et al. |
| 2004/0120889 | A1 | 6/2004 | Shah et al. |
| 2004/0148857 | A1 | 8/2004 | Strizki et al. |
| 2004/0161646 | A1 | 8/2004 | Rezachek et al. |
| 2004/0191152 | A1 | 9/2004 | Amendola et al. |
| 2004/0215407 | A1 | 10/2004 | Thielman et al. |
| 2005/0132640 | A1 | 6/2005 | Kelly et al. |
| 2005/0135996 | A1 | 6/2005 | Ortega et al. |
| 2005/0142410 | A1 | 6/2005 | Higashi et al. |
| 2005/0166812 | A1 | 8/2005 | Noll et al. |
| 2005/0181245 | A1 | 8/2005 | Bonne et al. |
| 2005/0199546 | A1 | 9/2005 | Rusta-Sallehy et al. |
| 2005/0238573 | A1 | 10/2005 | Zhang et al. |
| 2005/0260461 | A1 | 11/2005 | Wood et al. |
| 2005/0262924 | A1 | 12/2005 | Wood et al. |
| 2005/0268555 | A1 | 12/2005 | Amendola et al. |
| 2005/0276746 | A1 | 12/2005 | Zhang et al. |
| 2006/0014059 | A1 | 1/2006 | Wood |
| 2006/0021279 | A1 | 2/2006 | Mohring et al. |
| 2006/0040152 | A1 | 2/2006 | Wood |
| 2006/0045228 | A1 | 3/2006 | Shiao et al. |
| 2006/0102489 | A1 | 5/2006 | Kelly |
| 2006/0102491 | A1 | 5/2006 | Kelly et al. |
| 2006/0144701 | A1 | 7/2006 | Kelly |
| 2006/0210850 | A1 | 9/2006 | Abouatallah et al. |
| 2006/0261349 | A1 | 11/2006 | Doering et al. |
| 2007/0105008 | A1 | 5/2007 | Gu et al. |
| 2007/0217994 | A1 | 9/2007 | Amendola et al. |
| 2007/0224472 | A1 * | 9/2007 | Fujita et al. ................ 429/22 |
| 2007/0259220 | A1 * | 11/2007 | Redmond ................ 429/12 |
| 2007/0259227 | A1 | 11/2007 | Oishi et al. |
| 2007/0269698 | A1 | 11/2007 | Gu |
| 2007/0275291 | A1 | 11/2007 | Gu et al. |
| 2007/0277870 | A1 | 12/2007 | Wechsler |
| 2007/0287059 | A1 | 12/2007 | Eickhoff et al. |
| 2009/0035623 | A1 * | 2/2009 | Tsuji ..................... 429/19 |
| 2009/0272588 | A1 * | 11/2009 | Ryu et al. ................. 180/65.31 |
| 2010/0233553 | A1 * | 9/2010 | Eickhoff ................ 429/423 |

FOREIGN PATENT DOCUMENTS

| | | |
|---|---|---|
| EP | 1351329 | 10/2003 |
| EP | 1496561 | 1/2005 |
| EP | 1372205 | 10/2008 |
| GB | 723180 | 2/1955 |
| GB | 2164446 | 3/1986 |
| JP | 57138782 | 8/1982 |
| JP | 60000066 | 1/1985 |
| JP | 4342439 | 11/1992 |
| JP | 666787 | 3/1994 |
| JP | 9326259 | 12/1997 |
| WO | 0035032 | 6/2000 |
| WO | 0045457 | 8/2000 |
| WO | 0185606 | 11/2001 |
| WO | 03084866 | 10/2003 |
| WO | 2004025750 | 3/2004 |
| WO | 2004035464 | 4/2004 |
| WO | 2004075375 | 9/2004 |
| WO | 2005013403 | 2/2005 |

OTHER PUBLICATIONS

Amendola et al., "A Novel High Power Density Borohydride-Air Cell," Electromechanical Society Proceedings, vol. 98-15, pp. 47-54, Nov. 1, 1998.

Amendola et al., "A Safe Portable Hydrogen Gas Generator Using Aqueous Borohyfride Solution and Ru Catalyst," International Journal of Hydrogen Energy, Vo., 25, No. 10, pp. 969-975, 2000.

Amendola et al., An Ultrasafe Hydrogen Generator: Aqueous, Alkaline Borohydride Solutions and Ru Calalyst, Journal of Power Sources, vol. 85, No. 2, pp. 186-189, 2000.

http://www.engadget.com/2010/02/03/horizon-debuts-h-cell..., "Horizon Debuts H-Cell 2.0 Hydrogen Fuel Cell System for R/C Cars," 3 pages, printed Feb. 12, 2010.

Horizon Fuel Cell Technologies, "Hobby RC Industry Leaps into the Future with Hydrogen Power," 2 pages, Feb. 3, 2010.

* cited by examiner

FUEL CELL RECHARGER

CROSS-REFERENCE TO RELATED APPLICATION

This application is related to U.S. patent application Ser. No. 11/451,165, filed Jun. 12, 2006, and entitled "FUEL CELL RECHARGER", the entire disclosure of which is incorporated herein by reference.

TECHNICAL FIELD

The disclosure relates generally devices for recharging fuel cells and methods for recharging fuel cells. More particularly, the disclosure relates to devices and methods for recharging hydrogen fuel cells.

BACKGROUND

Fuel cells are fast becoming high energy density portable fuel sources that may replace many batteries in use today. One form of fuel cell contains a fuel that provides hydrogen to a membrane that operates to product electricity by combining the hydrogen with oxygen to form water. Fuels that may be used include, for example, metal hydrides and/or other substances that can store hydrogen and release it at selected pressures. Such fuel cells may be recharged by exposing them to pressurized hydrogen. There is a need for improved devices and methods for recharging fuel cells, including recharging fuel cells in non-commercial environments such as in a consumer's home.

SUMMARY

The disclosure provides design, material, manufacturing method, and use alternatives for recharging a fuel cell and methods for recharging a fuel cell cartridge. An example fuel cell recharger may include a housing having a fuel cell cartridge holder. A water reservoir may be disposed in the housing and may have water disposed therein. In some instances, the recharging apparatus may include an electrolysis chamber for converting water into hydrogen and oxygen. The electrolysis chamber may be in fluid communication with the water reservoir. The electrolysis chamber may include a hydrogen passage for passing hydrogen from the electrolysis chamber to the fuel cell cartridge holder. The recharging apparatus may also include a vacuum pump. The vacuum pump may be configured to vent residual hydrogen from a fuel cell cartridge disposed in the fuel cell cartridge holder.

An example method for recharging a fuel cell cartridge may include providing an apparatus for recharging the fuel cell cartridge. The apparatus may include a housing having a fuel cell cartridge holder formed therein, a water reservoir disposed in the housing and having water disposed therein, an electrolysis chamber, and a vacuum pump. The method may include disposing a fuel cell cartridge in the fuel cell cartridge holder, venting residual hydrogen from the fuel cell cartridge with the vacuum pump, and recharging the fuel cell cartridge by passing hydrogen generated by the electrolysis chamber into the fuel cell cartridge. In some instances, the vacuum pump may be used to determine if a fuel cell cartridge disposed in fuel cell cartridge holder is leaky and requires replacement.

The above summary of some embodiments is not intended to describe each disclosed embodiment or every contemplated implementation. The Figures and Description that follow more particularly exemplify several illustrative embodiments.

BRIEF DESCRIPTION OF THE DRAWINGS

The invention may be more completely understood in consideration of the following detailed description of various embodiments of the invention in connection with the accompanying drawings, in which.

Figure 1:
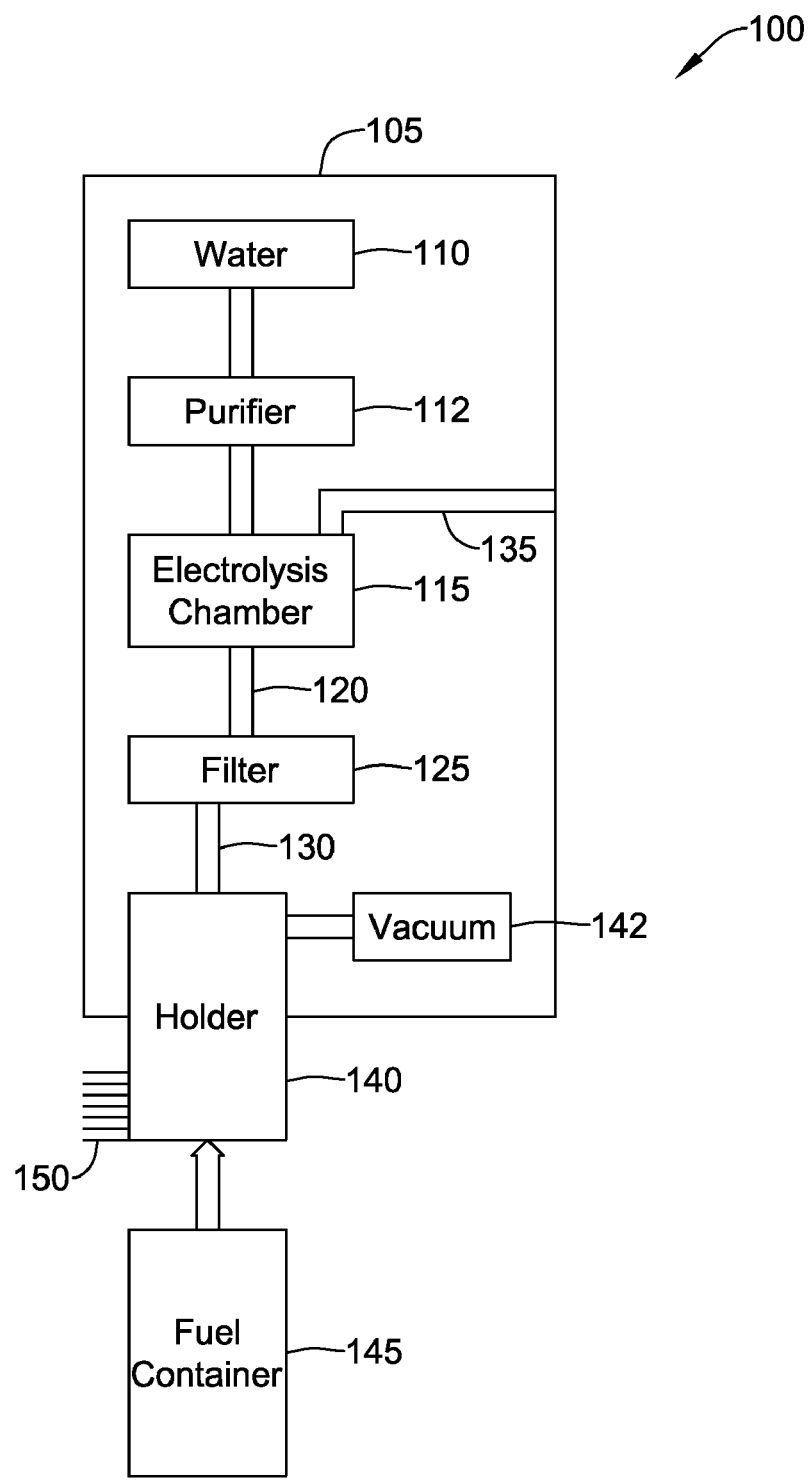
FIG. 1 is a block diagram of a portable hydrogen fuel cell cartridge charger according to an example embodiment.

While the disclosure is amenable to various modifications and alternative forms, specifics thereof have been shown by way of example in the drawings and will be described in detail. It should be understood, however, that the intention is not to limit the invention to the particular embodiments or examples described. On the contrary, the intention is to cover all modifications, equivalents, and alternatives falling within the spirit and scope of the disclosure.

DESCRIPTION

The following description should be read with reference to the drawings in which similar elements in different drawings are numbered the same. The drawings, which are not necessarily to scale, depict certain illustrative embodiments and are not intended to limit the scope of the invention.

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

FIG. 1 is a block diagram of an example hydrogen fuel cell recharging apparatus illustrated generally at 100. In one embodiment, the apparatus 100 is contained in or otherwise includes a housing 105 that may be of convenient and portable size, and may also provide for connections to an electrical power source. Apparatus 100 may include a water reservoir 110 that may provide a source of water for the production of hydrogen. In one embodiment, the water may be tap water, filtered water, distilled water, or deionized water. Deionized water or distilled water may be used to minimize contamination of other elements of apparatus 100. Disposing water in water reservoir 110 may include simply pouring suitable water directly into water reservoir. Alternatively, water may be provided to water reservoir 110 in other manners including those disclosed below.

In one embodiment, a water purifier 112 may be coupled to the water reservoir 110. Water purifier 112 may be an ion exchange resin based water purifier or other type of water purifier. In a further embodiment, a water purifier need not be used. An electrolysis chamber 115 may be in fluid communication with water reservoir 110 and, thus, may receive water from water reservoir 110 and/or water purifier 112. When coupled to a suitable power source (not shown), electrolysis chamber 115 may separate water into hydrogen and oxygen. In one embodiment, a PEM (proton exchange membrane) such as those used in fuel cells is used as or is otherwise included with electrolysis chamber 115. When a voltage is applied across the PEM with electrodes, and catalyst is applied to its surface, water is split into hydrogen and oxygen, which are generated at the cathode and anode respectively. The gasses are generated on different sides of the membrane. Hydrogen is provided via a passage 120 to, for example, a filter 125. Filter 125 may remove impurities from the hydrogen stream, and may provide a purified hydrogen stream to a passage 130. Oxygen may be vented to the surrounding atmosphere, such as by an oxygen passage 135. While filter 125 is shown in the illustrative embodiment of FIG. 1, it need not be provided in every embodiment.

Passage 130 may provide hydrogen to a fuel cell cartridge holder 140 into which a fuel cell cartridge (which may include, for example, a fuel container and/or a full fuel cell) may be inserted for reception of pressurized hydrogen. The fuel cell cartridge, shown generally at 145, may in various embodiments include a medium that can hold hydrogen, such as various metal hydrides or carbon nanotubes or other carbon nano-structures, or may even be a pressurized hydrogen tank if desired. The fuel cell cartridge holder 140 may have appropriate coupling mechanisms to sealingly couple to the fuel cell cartridge 145 to avoid leakage of hydrogen during filling of the fuel cell cartridge 145.

Example metal hydrides that may be reversed or recharged with hydrogen include $LaNi_5H_5$, $FeTiH_2$, $Mg_2NiH_4$, and $TiV_2H_4$. Example reversible chemical hydrides include but are not limited to $NaAlH_4$, $LiAlH_4$, $Mg(AlH_4)_2$, $Ti(AlH_4)_4$, $Fe(BH_4)_4$, $NaBH_4$, and $Ca(BH_4)_2$.

Apparatus 100 may also include a vacuum pump 142, sometimes disposed adjacent fuel cell cartridge holder 140. Vacuum pump 142 may be used to vent or otherwise remove residual hydrogen gas that may be contained within a fuel cell cartridge 145 that may be disposed within fuel cell cartridge holder 140.

In general, vacuum pump 142 may be used prior to filling a fuel cell cartridge 145. For example, vacuum pump 142 may be used to vent residual hydrogen from a fuel cell cartridge 145 over a period of time. In some instances, the flow rate (or pressure) from vacuum pump 142 may be monitored over time to determine if a leak rate, if present, from fuel cell cartridge 145 is greater than a threshold limit. Alternatively, or in addition, the vacuum pump 142 may be turned on for a period of time to generate a certain vacuum level in the fuel cell cartridge 145, and then shut off. Once shut off, the pressure in the fuel cell cartridge 145 may be monitored over time to see if a leak rate, if present, from fuel cell cartridge 145 is greater than a threshold limit. These are just a few examples of methods that can be employed to determine if the fuel cell cartridge 145 that is inserted into the fuel cell cartridge holder 140 contains a leak.

In some instances, an undesirable leak rate may be communicated to an end user by an appropriate indicator signal (e.g., audible, visual, etc.) from apparatus 100, which alerts the user that the fuel cell cartridge 145 may be defective or otherwise unsuitable for continued use. If it determined that the fuel cell cartridge 145 is defective, the use of fuel cell cartridge 145 can be terminated so as to avoid the use of a defective fuel cell cartridge 145 that could pose a potential fire and/or explosion hazard. Thus, in some instances, the vacuum pump 142 may add an additional level of safety and/or confidence in the use of apparatus 100 by virtue of vacuum pump 142 being configured to help determine if a fuel cell cartridge 145 is still suitable for continued use.

In some embodiments, an electrolyzer may be used which provides hydrogen and oxygen to a selectively permeable membrane. Such electrolyzers may typically involve discrete electrodes placed in water, with oxygen and hydrogen bubbling up from the electrodes when a current is applied. The selectively permeable membrane allows hydrogen to pass through, while venting oxygen, to ambient or other destination as desired.

In one embodiment, a heat exchanger 150 may be positioned near that fuel cell cartridge 145 when coupled to the fuel cell cartridge holder 140 to extract heat. The provision of hydrogen under pressure to the fuel cell cartridge 145 can result in an exothermic reaction. To increase the speed at which the fuel cell cartridge 145 may be charged, it may be desirable for at least some of this heat to be extracted. In one embodiment, heat exchanger 150 may include fins for air cooling, or may be liquid cooled, such as by use of water from water reservoir 110. In some instances, charging can occur quite quickly, such as under a minute for some sizes of fuel cells, such as fuel cells capable of replacing "AA" batteries or similar sizes.

Figure 2:
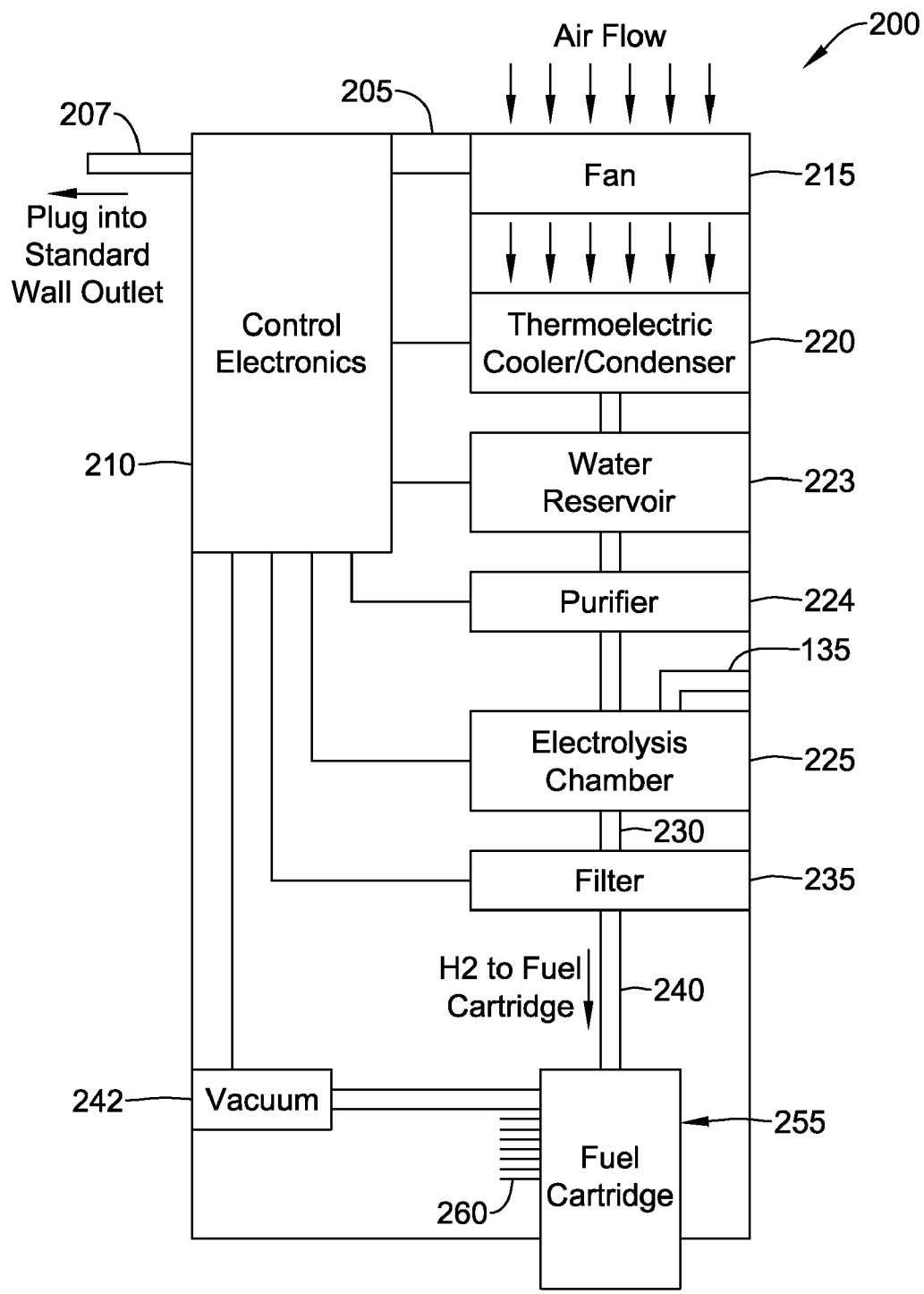
FIG. 2 is a block diagram illustrating further details of a portable hydrogen fuel cell cartridge charger according to an example embodiment.

FIG. 2 is a block diagram illustrating further details of a portable hydrogen fuel cartridge charger 200. In one embodiment, the charger 200 is contained in housing 205 that may be of convenient and portable size, and also provide for connections to desired power supplies. For example, housing 205 may have a connector 207 for connecting to a power supply, such as a standard wall outlet or transformer coupled to a power supply grid. In some instances, connector 207 may be coupled to a battery, such as a 12 volt automobile battery or the like.

In the illustrative embodiment, control electronics 210 are shown coupled to various sensor and controllers for controlling the charging of fuel cells and/or fuel cell cartridges. In one embodiment, a fan 215 is coupled to a thermoelectric cooler/condenser 220 to provide ambient air. Cooler/condenser 220 may include wicking material or other structures on which water may be condensed and transported. Ambient air may have sufficient humidity to allow the cooler/condenser to condense enough water to fill a water reservoir 223 to desired levels. In one embodiment, the water may be tap water, filtered water, or deionized water. Deionized water is obtained from the cooler/condenser 220 and may be used to minimize contamination of other elements of the charger 200.

In one embodiment, a water purifier 224 may be coupled to the water reservoir 223. When provided, the water purifier may be an ion exchange resin based water purifier or other type of water purifier. In some cases, a water purifier need not be used. An electrolysis chamber 225 may be coupled to receive water, such as from the water reservoir 223 or water purifier 224. When coupled to a suitable power source, electrolysis chamber 225 may separate the water into hydrogen and oxygen. In one embodiment, a PEM (proton exchange membrane) such as those used in fuel cells may be used in electrolysis chamber 225. When a voltage is applied across the PEM with electrodes, and catalyst is applied to its surface, water is split into hydrogen and oxygen, which are generated at the cathode and anode respectively. The gasses are generated on different sides of the membrane. Hydrogen may be provided via a passage 230 to a filter 235. Filter 235, when provided, may remove impurities from the hydrogen stream, and provide hydrogen to a passage 240. Oxygen may be vented to ambient, such as by passage 135. As above, other electrolyzers with or without separation membranes may be used, as desired.

Passage 240 may provide the hydrogen to a fuel cartridge holder 255 into which a fuel cell cartridge (not explicitly shown) for a fuel cell may be inserted for reception of pressurized hydrogen. The fuel cell cartridge may include a medium that can hold hydrogen, such as various metal hydrides or carbon nanotubes or other carbon nano-structures, or may even be a pressurized hydrogen tank if desired. The fuel cartridge holder 255 may have appropriate coupling mechanisms to sealingly couple to the fuel cell cartridge to avoid leakage of hydrogen during filling.

Apparatus 200 may also include vacuum pump 242 which may be similar in form and function to vacuum pump 142 discussed above. For example, vacuum pump 242 may be used to evacuate residual hydrogen and/or other gases or materials from the fuel cell cartridge and/or determine if the fuel cell cartridge is leaky and requires replacement.

In one embodiment, a heat exchanger 260 may be positioned near fuel cartridge holder 255 to extract heat. The provision of hydrogen under pressure to a fuel cell cartridge can result in an exothermic reaction. To help increase the speed at which the fuel cell cartridge may be charged, it may be desirable for at least some of that heat to be extracted. In one embodiment, heat exchanger 260 may include fins for air cooling, or apparatus 200 may be liquid cooled, such as by use of water from the water reservoir 223 or the like. Charging can occur relatively quickly, such as under a minute for some sizes of fuel cells, such as fuel cells capable of replacing "AA" batteries or similar sizes.

Controller 210 is shown coupled to multiple elements of the charger unit 200. The connections represent connections to various sensors and/or to controllers. For example, controller 210 may be coupled to a level sensor to sense the level of water in the water reservoir 223. When the level reaches a predetermined high point, no further water is needed, and the fan and thermoelectric cooler/condenser may be turned off by controller 210. When the level reaches a predetermined low point, more water may be needed, and the fan and thermoelectric cooler/condenser may be turned on by controller 210.

Controller 210 may also be coupled to a relative humidity sensor to optimize airflow for condensing water. A temperature sensor may be coupled proximate the fuel cartridge holder 255 to sense heat and pressure, and regulate the cooling of the fuel cell cartridge and/or pressure of the hydrogen being supplied. It may also sense that the fuel cell cartridge is fully charged and stop the provision of further hydrogen, such as when the temperature returns to near ambient. The controller 210 may be coupled to status lights, such as a red light for indicating charging is in process and a green light for indicating completion of charging. Audible alarms may be provided in some embodiments. Controller 210 may also be coupled to vacuum pump 242 in order to determine the flow rate through vacuum pump 242 and, if desired, provide an appropriate control signal.

Figure 3:
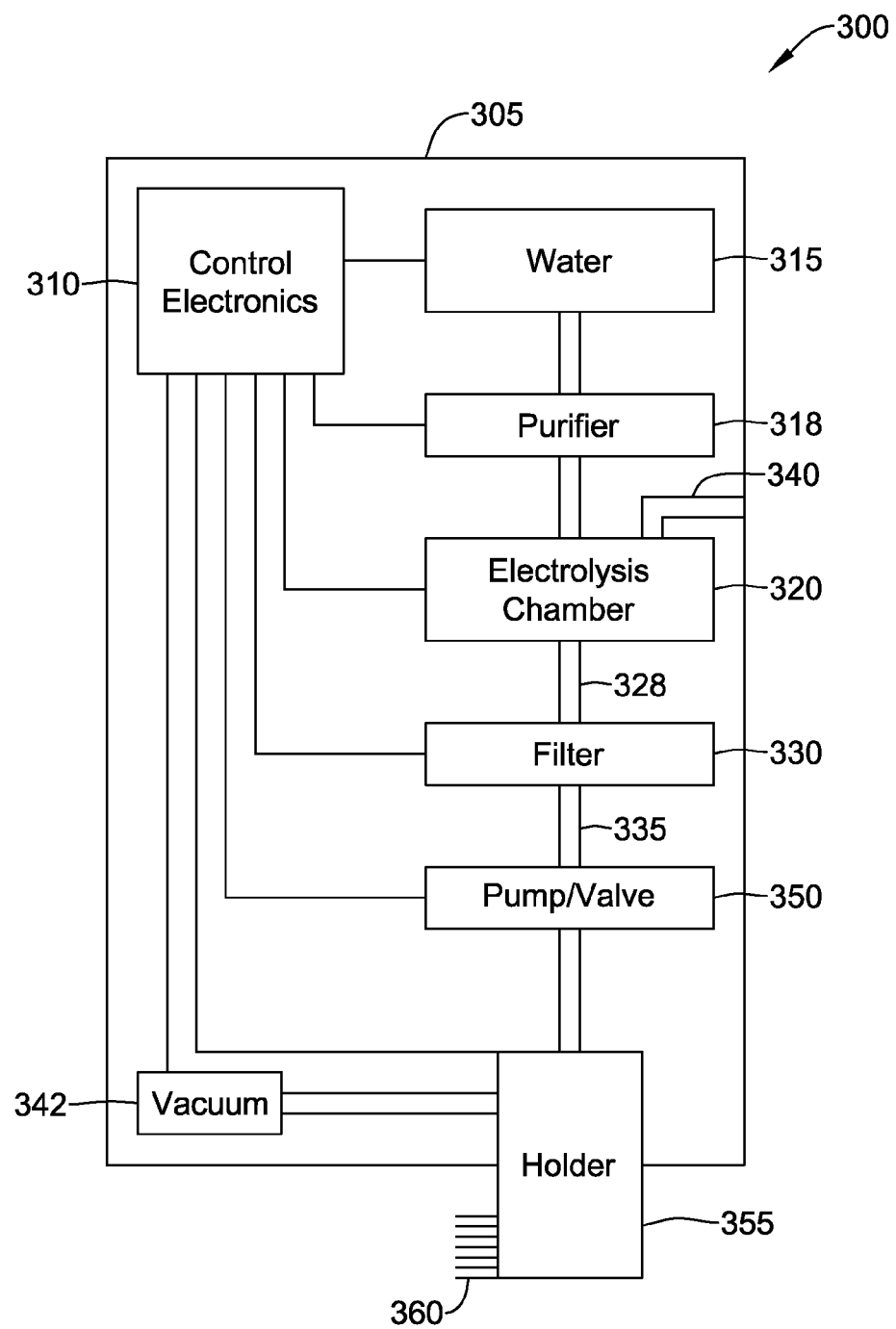
FIG. 3 is a block diagram illustrating details of a further alternative portable hydrogen fuel cell cartridge charger according to an example embodiment.

FIG. 3 is a block diagram illustrating details of a further alternative portable hydrogen fuel charging apparatus indicated generally at 300. In one embodiment, apparatus 300 is contained in housing 305 that may be of convenient and portable size, and also provide for connections to desired power supplies. A controller 310 may control operation of the charger 300 through the provision of actuators and switches, as well as sensors to obtain process information as described with respect to previous embodiments. A water reservoir 315 may provide a source of water for hydrogen production. In one embodiment, the water may be tap water, bottled water, filtered water, or deionized water to name a few sources. Deionized water may be used to minimize contamination of other elements of the charger 300.

In one embodiment, a water purifier 318 may be coupled to the water reservoir 315. When provided, the water purifier 318 may be an ion exchange resin based water purifier or other type of water purifier. In some embodiments, a water purifier need not be used. An electrolysis chamber 320 may be coupled to receive water, such as from the water reservoir 315 or water purifier 318. When coupled to a suitable power source, electrolysis chamber 320 may separate the water into hydrogen and oxygen. In one embodiment, a PEM (proton exchange membrane) such as those used in fuel cells is used in electrolysis chamber 320. When a voltage is applied across the PEM with electrodes, and catalyst is applied to its surface, water is split into hydrogen and oxygen, which are generated at the cathode and anode respectively. The gasses are generated on different sides of the membrane. Hydrogen may be provided via a passage 328 to an optional filter 330. Optional filter 330 may remove impurities from the hydrogen stream, and may provide hydrogen to a passage 335. Oxygen may be vented to ambient, such as by passage 135. As above, other electrolyzers with or without separation membranes may be used, as desired.

Passage 335 provides the hydrogen to a pump/valve 350 that may be controlled to provide and regulate pressurized hydrogen from passage 335 to a fuel cell cartridge holder 355 into which a fuel cell cartridge may be inserted for reception of pressurized hydrogen. The fuel cell cartridge in various embodiments may include a medium that can hold hydrogen, such as various metal hydrides or carbon nanotubes or other carbon nano-structures, or may even be a pressurized hydrogen tank if desired. The fuel cell cartridge holder 335 may have appropriate coupling mechanisms to sealingly couple to the fuel cell cartridge to avoid leakage of hydrogen during filling.

In one embodiment, a heat exchanger 360 may be positioned proximate that fuel cell cartridge when coupled to the fuel cell cartridge holder 355 to extract heat. The provision of hydrogen under pressure to the fuel cell cartridge may result in an exothermic reaction. To increase the speed at which the fuel cell cartridge may be charged, it may be desirable for at least some of this heat to be extracted. In one embodiment, the heat exchanger 360 may include fins for air cooling, or apparatus 300 may be liquid cooled, such as by use of water from the water reservoir 315. In some instances, charging can occur quite quickly, such as under a minute for some sizes of fuel cells, such as cells capable of replacing "AA" batteries or similar sizes.

Apparatus 300 may also include vacuum pump 342 which may be similar in form and function to vacuum pumps 142/242 discussed above. For example, vacuum pump 342 may be used to evacuate residual hydrogen and/or other gases or materials from the fuel cell cartridge and/or determine if the fuel cell cartridge is leaky and requires replacement.

Figure 4:
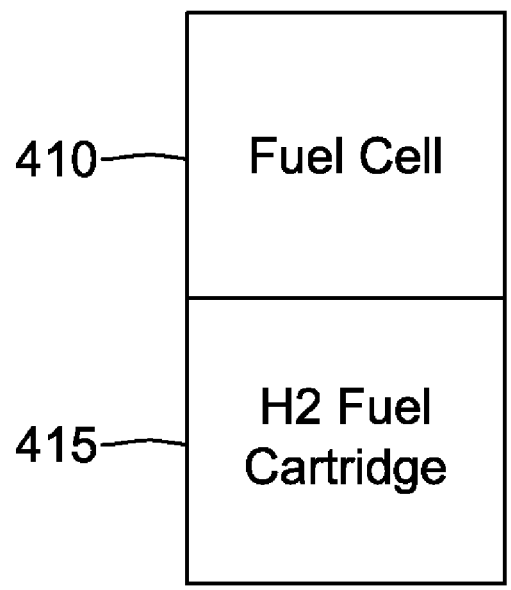
FIG. 4 is a block diagram illustrating a fuel cell with a rechargeable fuel cartridge according to an example embodiment.

FIG. 4 is a block diagram illustrating a fuel cell 410 with a rechargeable fuel cartridge 415 according to an example embodiment. In one embodiment, the fuel cartridge uses a valved connector for coupling to the fuel cell 410 to provide hydrogen to the fuel cell. The valve may be used to couple to the fuel cell cartridge holder 355 to allow hydrogen to be fed into the fuel cartridge 415 when coupled to the charger 300. The valve may prevent hydrogen from leaking from the cartridge when the cartridge is being switched between the fuel cell and charger. In one embodiment, the combination of fuel cell 310 and cartridge 315 may be formed to be substantially the same shape as a desired existing battery form factor, such as a nine volt, AA, AAA, C or D battery. Larger and different form factor combinations may also be provided.

Figure 5:
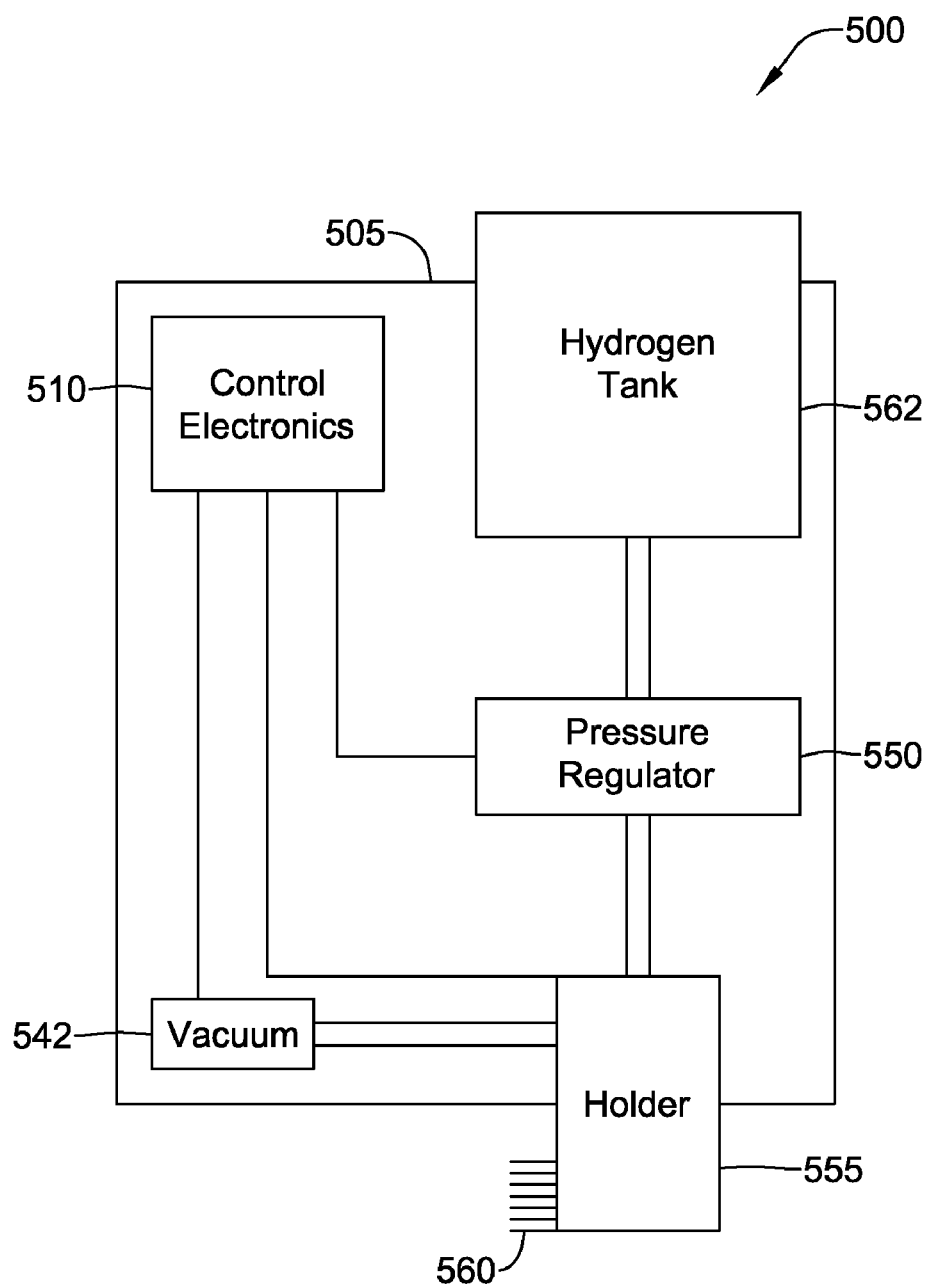
FIG. 5 is a block diagram illustrating details of a further alternative portable hydrogen fuel cell cartridge charger according to an example embodiment.

FIG. 5 is a block diagram illustrating another example fuel cell charging apparatus 500 that may be similar in form and function to other charging apparatuses disclosed herein. Apparatus 500 may include housing 505. Disposed, for example, within housing 505 may be a hydrogen tank 562. Tank 562 may allow a user to recharge a fuel cell without the need of a water source for the generation of hydrogen. It can be appreciated that hydrogen tank 562 may be utilized in any of the other recharging apparatuses disclosed herein. Tank 562 may be coupled to pressure regulator 550, which in turn is coupled to fuel cell holder 555. Regulator 550 may regulate the pressure at which hydrogen is conveyed to holder 555. Holder 555 may include heat sink 560. Vacuum 542 may be coupled to holder 555 and may be used in a manner similar to other vacuums disclosed herein. Control electronics 510 may be coupled to one or more components of apparatus 500 including, for example, pressure regulator 550, holder 555, and vacuum 542.

It should be understood that this disclosure, in many respects, is only illustrative. Changes may be made in details, particularly in matters of shape, size, and arrangement of steps without exceeding the scope of the invention. The invention's scope is, of course, defined in the language in which the appended claims are expressed.

What is claimed is:

1. An apparatus for recharging a fuel cell, comprising:
a housing having a fuel cell cartridge holder;
a water reservoir disposed in the housing and having water disposed therein;
an electrolysis chamber for converting water into hydrogen and oxygen, the electrolysis chamber being in fluid communication with the water reservoir;
wherein the electrolysis chamber includes a hydrogen passage for passing hydrogen from the electrolysis chamber to the fuel cell cartridge holder;
a vacuum pump in fluid communication with the fuel cell cartridge holder, the vacuum pump being configured to selectively vent residual hydrogen from a fuel cell cartridge disposed in the fuel cell cartridge holder; and
a controller coupled to the vacuum pump, the controller configured to activate the vacuum pump to vent residual hydrogen from a fuel cell cartridge disposed in the fuel cell cartridge holder prior to recharging of the fuel cell cartridge with hydrogen from the fuel cell cartridge holder.

2. The apparatus of claim 1, wherein the electrolysis chamber includes a proton exchange membrane.

3. The apparatus of claim 1, further comprising a heat exchanger disposed in thermal communication with the fuel cell cartridge holder.

4. The apparatus of claim 1, further comprising a water purifier disposed between the water reservoir and the electrolysis chamber.

5. The apparatus of claim 1, further comprising a hydrogen filter disposed between the electrolysis chamber and the fuel cell cartridge holder.

6. The apparatus of claim 1, wherein the apparatus is configured to be powered by standard household current, a battery, or a car battery.

7. The apparatus of claim 1, wherein the water reservoir receives water from a water source.

8. The apparatus of claim 7, wherein the water source includes a condenser that extracts water from air.

9. The apparatus of claim 1, further comprising a pump coupled to the fuel cell cartridge holder for controlling the pressure of hydrogen provided to the fuel cell through the hydrogen passage.

10. The apparatus of claim 1, wherein the electrolysis chamber includes an oxygen passage for venting oxygen.

11. The apparatus of claim 1, wherein the fuel cell cartridge includes a metal hydride.

12. A method for recharging a hydrogen fuel cell, comprising:
providing an apparatus for recharging a hydrogen fuel cell cartridge, the apparatus including:
a housing having a fuel cell cartridge holder;
a water reservoir disposed in the housing and having water disposed therein;
an electrolysis chamber;
a vacuum pump in fluid communication with the fuel cell cartridge holder;
disposing a fuel cell cartridge in the fuel cell cartridge holder;
venting residual hydrogen from the fuel cell cartridge with the vacuum pump; and
after venting residual hydrogen from the fuel cell cartridge, recharging the fuel cell cartridge by passing hydrogen generated in the electrolysis chamber into the fuel cell cartridge.

13. The method of claim 12, wherein the electrolysis chamber includes a proton exchange membrane.

14. The method of claim 12, further comprising removing heat from the apparatus with a heat exchanger disposed in thermal communication with the fuel cell cartridge holder.

15. The method of claim 12, further comprising purifying water in the water reservoir with a water purifier.

16. The method of claim 12, further comprising filtering hydrogen generated in the electrolysis chamber with a hydrogen filter.

17. The method of claim 12, further comprising venting oxygen from the electrolysis chamber.

18. The method of claim 12, further comprising monitoring the flow rate through the vacuum pump over time in order to determine if the fuel cell cartridge is defective.

19. A hydrogen fuel cell cartridge recharging apparatus, comprising:
a housing;
a water reservoir;
an electrolysis chamber in fluid communication with the water reservoir;
a hydrogen conduit extending from the electrolysis chamber to a fuel cell cartridge holder;
a vacuum pump at least selectively in fluid communication with the fuel cell cartridge holder, the vacuum pump configured to selectively vent residual hydrogen from the fuel cell cartridge prior to recharging the fuel cell cartridge; and
a controller coupled to the vacuum pump, the controller configured to activate the vacuum pump and to monitor a pressure in a fuel cell cartridge disposed in the fuel cell cartridge holder to determine if the fuel cell cartridge holder contains a leak.

* * * * *